(12) United States Patent
Suzuki et al.

(10) Patent No.: US 6,171,360 B1
(45) Date of Patent: Jan. 9, 2001

(54) BINDER FOR INJECTION MOLDING OF METAL POWDER OR CERAMIC POWDER AND MOLDING COMPOSITION AND MOLDING METHOD WHEREIN THE SAME IS USED

(75) Inventors: Katsunori Suzuki; Toshiharu Fukushima, both of Hamamatsu (JP)

(73) Assignee: Yamaha Corporation (JP)

( * ) Notice: Under 35 U.S.C. 154(b), the term of this patent shall be extended for 0 days.

(21) Appl. No.: 09/287,871

(22) Filed: Apr. 7, 1999

(30) Foreign Application Priority Data

Apr. 9, 1998 (JP) .................................. 10-097883

(51) Int. Cl.⁷ ...................................... B22F 1/00
(52) U.S. Cl. .............................. 75/255; 524/28; 264/122; 536/3; 419/36; 419/38
(58) Field of Search ................... 536/3; 75/230, 75/231, 245, 255; 419/36, 37, 38; 524/28; 264/122

(56) References Cited

U.S. PATENT DOCUMENTS

| 4,734,237 | 3/1988 | Fanelli et al. ........................ 264/122 |
|---|---|---|
| 5,258,155 | 11/1993 | Sekido et al. ........................ 264/109 |
| 5,286,767 | * 2/1994 | Rohrbach et al. . |
| 5,496,936 | * 3/1996 | Thami et al. ........................ 536/124 |

FOREIGN PATENT DOCUMENTS

| 6-168810 | 6/1994 | (JP) . |
|---|---|---|
| 6-506183 | 7/1994 | (JP) . |
| 6287601 | 10/1994 | (JP) . |
| 6316703 | 11/1994 | (JP) . |
| 11-3811 | 1/1999 | (JP) . |
| 11-36002 | 2/1999 | (JP) . |

OTHER PUBLICATIONS

List and brief explanation o the prior art references cited in the Japanese Office Action.

* cited by examiner

Primary Examiner—Ngoclan Mai
(74) Attorney, Agent, or Firm—Ostrolenk, Faber, Gerb & Soffen, LLP

(57) ABSTRACT

The present invention relates to a molding method characterized by kneading a binder comprising an agar having an average molecular weight of 30,000 to 150,000 with a metal powder, a ceramic powder, or a mixed powder thereof, injection-molding the thus obtained molding composition into a green body, removing at least the water from the green body, and then sintering the green body to obtain a molded product.

17 Claims, 3 Drawing Sheets

BINDER FOR INJECTION MOLDING OF METAL POWDER OR CERAMIC POWDER AND MOLDING COMPOSITION AND MOLDING METHOD WHEREIN THE SAME IS USED

BACKGROUND OF THE INVENTION

1. Field of the Invention

The present invention relates to a method for producing metal parts, ceramic parts, composite parts made of a metal with a ceramic, or the like from a metal powder, a ceramic powder, or a mixture of them with a binder by the injection molding method and a molding composition used therein.

2. Description of the Related Art

In the method for injection-molding a metal powder or a ceramic powder, the metal powder, the ceramic powder, or a mixed powder thereof is kneaded with a binder and the kneaded material is injection-molded with an injection molding machine into a green body having a desired three-dimensional shape. Then the green body is heated to be degreased by decomposing and removing part of the binder and is sintered by heating it at a high temperature to obtain a metal part, a ceramic part, or a composite part of a metal with a ceramic.

Conventionally, as a binder used in such a method for injection-molding a metal powder or a ceramic powder, an aqueous solution of a natural polysaccharide, such as agar, is known, whose sol-gel reversible reaction is utilized. Such a binder wherein a polysaccharide is used has the advantage that the removal of the binder is quite easy since water amounts to about 80% or more of the binder.

However, in the conventional art, if a molded green body cannot support the structure by itself since the subsequent handling becomes difficult an agar whose gel strength is relatively high and whose average molecular weight is as relatively high as about 200,000 to 300,000 is used as a binder.

However, a binder using an agar exhibits poor decomposability. Since the agar used in the binder has high gel strength and high molecular weight, the agar is difficult to decompose by heating and large amounts of the components of the agar residue memain after the sintering step. Therefore, the components of the agar, when sintered, are carbonized and form a graphite structure and consequently after the sintering, large amounts of carbon residue (C) and the oxygen residue (O) remain in the obtained product, thereby lowering mechanical strength of the product. Further, since the decomposability of the binder is poor, it leads to a problem that the sintered density of the obtained product cannot be increased.

Therefore, an object of the present invention is to provide a binder for injection molding of a metal powder or a ceramic powder having good thermal decomposability, thereby providing a molded product having high sintered density and excellent mechanical strength.

SUMMARY OF THE INVENTION

This invention relates to a binder for injection molding of a metal powder or a ceramic powder, comprising an agar having an average molecular weight of 30,000 to 150,000 and water.

This invention also relates to a molding composition comprising a binder comprising an agar having an average molecular weight of 30,000 to 150,000 and water, and at least one selected from the group consisting of a metal powder, a ceramic powder, and mixtures thereof This invention further relates to a method of injection-molding a metal powder or a ceramic powder, comprising the step of mixing the binder comprising an agar having an average molecular weight of 30,000 to 150,000 and water, and at least one of a metal powder, a ceramic powder, and mixtures thereof, to prepare a molding composition; the step of injection-molding said molding composition to form a desired-shaped green body; and the step of sintering said green body.

In the present binder for injection molding of a metal powder or a ceramic powder, the present molding composition wherein said binder is used, and the present molding method wherein said binder is used, the thermal decomposability of the binder is good, since a binder comprising an agar having low gel strength and low molecular weight and water is used. Therefore, after the sintering, a molded product having less carbon residue and oxygen residue, and therefore excellent in mechanical strength, an be obtained. Further, since the decomposability of the binder is good, a high sintered density can be attained.

DETAILED DESCRIPTION OF THE PREFERRED EMBODIMENT

Figure 1:
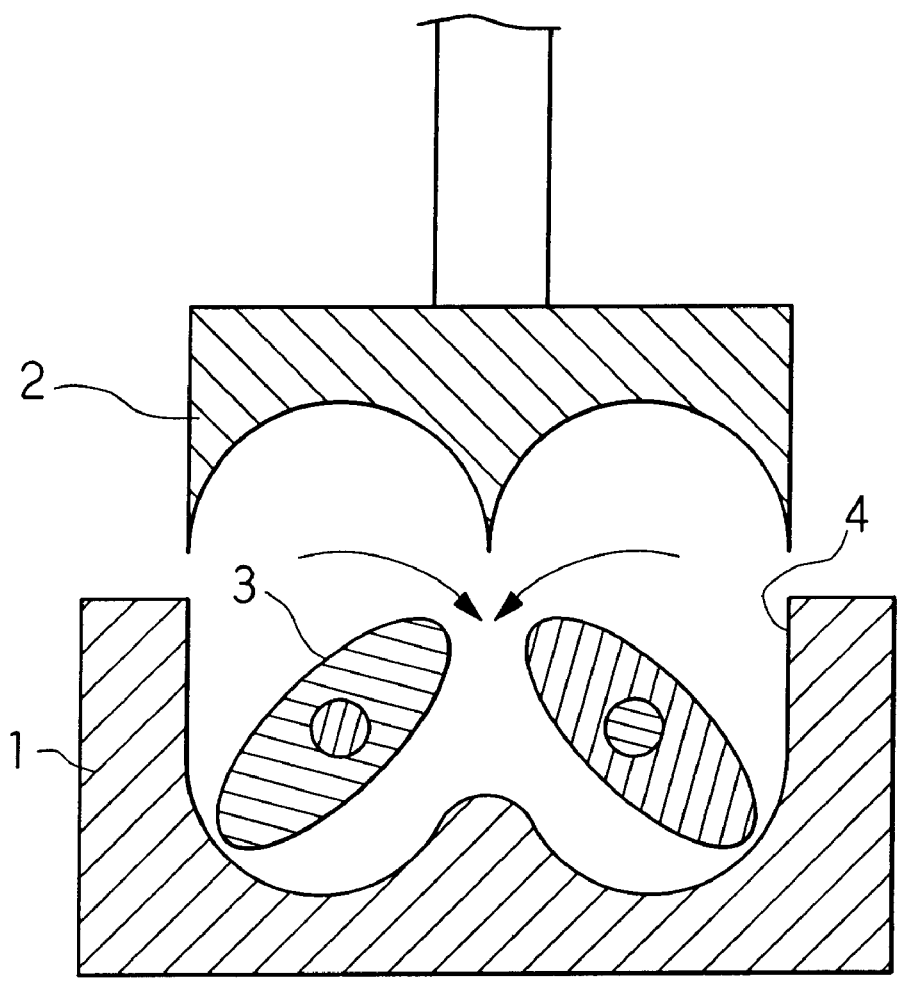
FIG. 1 is a cross-sectional view that shows an example of a kneading machine used in the production of the present composition for injection molding of a metal.

The present invention will be described below in detail. The present binder for injection molding of a metal powder or a ceramic powder (hereinafter occasionally referred to simply as a binder) comprises an agar and water. In the present invention, an agar having an average molecular weight of 30,000 to 150,000 is used.

Agar is an extract of a seaweed generally called "Japanese isinglass," its major component is agarose, and other impurities are called agaropectin collectively. Agar is soluble in warm water, its aqueous solution becomes a sol-like viscous liquid at 90 to 96° C., and when it is cooled to 35 to 45° C. or below, it gels and becomes an elastic solid with reduced volume. The gel point and the sol point are substantially the same regardless of the concentration of agar. When the agar powder is dissolved in water to form a gel, its gel strength varies depending on the kind of seaweed, the kinds of compounded seaweed, the method of the extraction of agar, or the like.

In the present invention, if the average molecular weight of the agar is lower than 30,000, the green body has low strength and is difficult to retain its shape, and the sintered product has poor dimensional stability. On the other hand, if the average molecular weight of the agar is higher than 150,000, the agar has low decomposability, thereby the sintered product has low sintered density and low mechanical strength.

The average molecular weight of an agar can be measured by a conventional method such as High Performance Liquid Chromatography (HPLC). In this method, several standard samples with known molecular weights are analyzed by the HPLC and their retention time is measured, and then a standard curve is obtained based on the molecular weights and the retention time of each standard sample. Using this standard curve, the average molecular weight of an agar can be determined.

The binder of the present invention is obtained by dissolving an agar in water and specifically by dissolving 15 to 35 parts by weight (hereinafter parts by weight being referred to as parts), preferably 20 to 30 parts, of an agar in 100 parts of water. If the content of an agar is less than 15 parts, the sufficient effect for binding metal powders, and/or ceramic powders cannot be obtained. If the content of an agar is over 35 parts, the viscosity of the sol state binder becomes too high and kneading binder with powders becomes difficult.

The binder of the present invention may include alcohols, such as one or a mixture of two or more of ethanol, methanol, isopropyl alcohol, 2,3-dibromopropanol, and the like. The alcohols increase the gel strength of the agar in gel state.

When alcohols are added, 5 to 30 parts of the alcohols added to 100 parts of water is preferable. If less than 5 parts of alcohols are added, the effect of increasing the gel strength is insufficient whereas if over 30 parts, the gel strength becomes decreasing. When alcohols are added, 15 to 35 parts of the agar is preferably dissolved in 100 parts of the mixture of water and alcohol.

Also, a water-soluble polymer may be added to the binder comprising an agar and water or the binder comprising an agar, water, and alcohols. As the water-soluble polymer, a polyethylene glycol, a polyvinyl alcohol, carboxymethylcellulose, and the like can be added, and a polyethylene glycol is particularly preferable. The water-soluble polymer renders the gel state binder viscousness, improves the fluidity of the injection raw material at the step of injection molding, and improves the separation of the binder and the metal powder and/or the ceramic powder.

When a water-soluble polymer is added to the binder, 5 to 10 parts of a water-soluble polymer added to 100 parts of water is preferable. If the water-soluble polymer is added in less than 5 parts, the effect of the addition are insufficient whereas if over 10 parts, the viscosity of the sol becomes disadvantageously high.

Further, as an antiseptic, benzoic acid, sodium benzoate, formic acid, or the like, and as a lubricant at the step of injection molding, stearic acid, erucic acid, a dispersant made of a metal soap of a higher fatty acid, a surfactant, or the like may be added to the binder if necessary. Further, sodium borate that increases the viscosity of the sol of the aqueous agar and the strength of the gel may be added.

The gel strength of an agar comprised in the binder of the present invention is preferably in the range of 200 to 480 $g/cm^2$, at 4% gel concentration. If the gel strength of the agar is lower than 200 $g/cm^2$, the green body has low strength and poor shape retainability, and the sintered product has poor dimensional stability. On the other hand, if the gel strength of the agar is higher than 480 $g/cm^2$, the agar has low decomposability and the sintered product has low sintered density, and low mechanical strength.

The gel strength of an agar can be measured by a method such as the one adopted by the Japan Fishery Union for Agar Production (Nikkansui method). In this method, the gel strength is defined as a maximum weight (g) per 1 $cm^2$ of gel surface area that the gel of 1.5% gel concentration can support. In this application, we followed this method with the exception of the gel concentration, which was 4%.

The present binder can be prepared, for example, by adding, to warm water heated to 90 to 96° C., an agar and, if necessary, alcohols, a water-soluble polymer, and other additives, and stirring and mixing them well at a temperature of 100 to 120° C. under a vapor pressure of 1.0 to 2.0 atm to dissolve them.

The molding composition comprises a binder comprising an agar having an average molecular weight of 30,000 to 150,000 and water, and at least one selected from the group consisting of a metal powder, a ceramic powder, and mixtures thereof Preferably the gel strength of the gel in the binder is in the range of 200–480 $g/cm^2$ at 4% gel concentration. The metal powder used as a raw material for the molding composition of the present invention is a globular or spherical fine powder of iron, steel such as stainless steel, tungsten, titanium, nickel, cobalt, copper, aluminum, chromium, molybdenum, or the like, that can be obtained by the gas atomization method, the water atomization method, the high-pressure water atomization method, or the like. The ceramic powder used as a raw material for a molding composition of the present invention is oxide, borate, nitride, silicate, and carbide of a metal, oxide, borate, nitride, silicate, and carbide of a non metal; and a mixture thereof However, the ceramic powder is not limited to these, and other types of ceramic powder can be chosen according to the application.

The metal powder has a globular or spherical shape whose average diameter is in the rage of 1 to 200 $\mu$m, preferably 1 to 100 $\mu$m, and more preferably 1 to 20 $\mu$m. The surface of the metal powder is preferably treated with the later-described coupling agent.

Since a metal powder having an average particle diameter smaller than 1 $\mu$m is difficult to produce and the cost of the production is high, it is not preferable. On the other hand, if the average diameter is greater than 200 $\mu$m, the binder and the metal powder are separated by the shearing force at the step of injection molding and therefore the molding may be impossible.

The ceramic powder also has a globular or spherical shape whose average diameter is preferably in the range of 0.1 to 10 $\mu$m The surface of the ceramic powder is preferably treated with a coupling agent.

The coupling agent is one that produces two functional groups upon hydrolyzing, one of which is a hydroxyl group reactable with the above metal powder, the other of which is an organic functional group reactable with polysaccharides in the binder. Specifically, a silane type coupling agent or a titanate type coupling agent having at least one of an amino group (—$NH_2$), a sulfo group (—$SO_3H$), an amido group (—NHCO—), and a hydroxyl group (—OH) on the side of the organic functional group is preferred.

As the titanate type coupling agent, for example, isopropyl trianthranyl titanate represented by the below-shown chemical formula (1), isopropyl tri(N-aminoethyl arninoethyl) titanate represented by the below-shown chemical formula (2), tetraisopropyl di(dilaurylphosphite) titanate represented by the below-shown chemical formula (3), and 4-aminobenzenesulfonyl dodecylbenzenesulfonyl oxyacetate titanate represented by the below-shown chemical formula (4) can be available.

As the silane coupling agent, for example, γ-(2-aminoethyl)aminopropyltrimethoxysilane represented by the below-shown chemical formula (5) can be available.

Chemical formula (I)

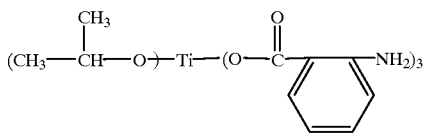

Chemical formula (2)

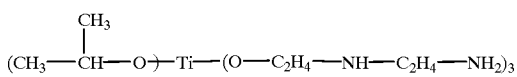

Chemical formula (3)

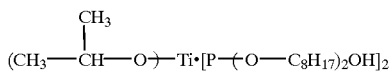

Chemical formula (4)

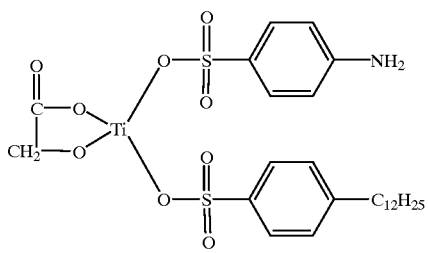

Chemical formula (5)

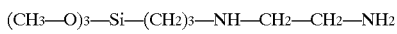

The amount of the added coupling agent is preferably 0.5 to 3% per unit volume of the metal powder. If the amount of the addition of the coupling agent is less than that, the effect of the addition is insufficient whereas if the amount is more than that, the effect of the addition is not increased further and if the amount is too large, the properties of the sintered products are adversely affected, which is not preferable.

There are two methods for surface-treating a metal powder and a ceramic powder with a coupling agent: the wet-treating method and the dry-treating method.

In the wet-treating method, a coupling agent is dispersed in a large amount of water and metal powder is added, followed by stirring, and after the mixture is allowed to stand for about 10 to 30 min at ordinary temperatures, the mixture is heated at a temperature of about 105° C. for 10 hours or more to be dried to obtain a surface-treated metal powder.

In the dry-treating method, a metal powder is stirred at a high speed with a high-speed mixer, such as a Henschel mixer (trade name), a coupling agent is added gradually, and the mixture is stirred further at a high speed of about 1,000 to 1,500 rpm for about 2 to 10 min with it being heated to 60 to 80° C. to obtain a surface-treated metal powder. This method can be preferably used particularly for the metal powder having a relatively large average diameter of about 10 to 200 μm.

In the present invention, the metal powder, the ceramic powder, or the mixture thereof (hereinafter referred to as the metal/ceramic powder sometimes) can be added to the binder in an amount of 35 to 70% by volume, preferably 40 to 60% by volume, more preferably 55% by volume. If the proportion of the metal/ceramic powder is less than 35% by volume, the molded product obtained after the sintering has low sintered density. Thus, to obtain a high sintered density and mechanical strength of the molded product, the proportion is preferably 40% by volume or more. On the other hand, if the proportion of the metal/ceramic powder is more than 70% by volume, kneading the binder with the powder uniformly is difficult. Thus, to secure a good kneading state, more preferably the proportion is 65% by volume or less.

Now, the present method for injection-molding a metal is described.

The method for injection molding a metal powder or a ceramic powder of the present invention comprises the steps of 1) mixing the binder comprising an agar having an average molecular weight of 30,000 to 150,000 and water, and at least one of a metal powder, a ceramic powder, and a mixture thereof, to prepare a molding composition, 2) injection-molding said molding composition to form a desired shaped green body; and 3) sintering said green body.

FIG. 1 is a cross-sectional view showing an example of a kneading machine suitably used in above-described step 1) of the present invention. This kneading machine is equipped with a mixing tank 1, a pressure lid 2, and two kneader blades 3, 3. The mixing tank 1 has a hollow bottomed kneading chamber 4 therein. The bottom of the kneading chamber 4 is divided into two generally semicylindrical parts, where respectively the kneader blades 3, 3 having a suitable shape are arranged in parallel. The two kneader blades 3, 3 are rotated in different directions, so that the material in the kneading tank 1 can be mixed and kneaded. Further, the wall and bottom of the kneading tank 1 are constructed in such a manner that the tank has a double-wall structure and by passing water or steam into the space therein, the temperature in the kneading chamber 4 can be adjusted to and retained at a prescribed value. The pressure lid 2 is constructed in such a manner that it closes the kneading tank 1 hermetically and the pressure in the kneading tank 1 can be adjusted to and retained at a prescribed value.

To carry out the molding, first, a metal/ceramic powder is added to a binder and the mixture is kneaded to obtain a molding composition. At that time, the kneading machine shown in FIG. 1 is suitably used to knead with the temperature and the vapor pressure kept at 100 to 120° C. and 1.0 to 2.0 atm respectively, so that the kneadability can be improved.

If the temperature at the step of kneading is lower than 100° C., the effect for improving the kneadability is insufficient whereas if the temperature is higher than 120° C., the agar is decomposed gradually and loses its ability of gelling, which is not preferable. Further, if the pressure at the step of kneading is lower than a vapor pressure of 1.0 atm, the effect of improving the kneadability is insufficient whereas if the vapor pressure is higher than 2.0 atom, the agar is decomposed gradually and loses its ability of gelling, which is not preferable.

Preferably, the metal/ceramic powder is pretreated with a coupling agent before the step 1).

Then, the obtained molding composition is preferably pelletized and the pellets are injection-molded to obtain a green body having a desired shape. The injection molding temperature is 90 to 96° C. at which temperature the binder is kept in the sol state.

The green body after the injection molding is cooled to ambient temperatures, at which temperature the binder changes to gel state, to retain the shape.

Then, the obtained green body is subjected to a binder removal step in which at least a part of the water contained in the binder is removed. Optionally, at least a part of the agar in the binder is also removed after the water removal. In removing the agar, the alcohols and/or water-soluble polymers that were added to the binder may be also removed.

The binder removal step may be carried out in various ways: preferable methods are, for example, a method wherein the green body is heated gradually from ordinary temperatures to 100 to 150° C. to remove the water and alcohols and then is further heated to 200 to 400° C. to remove the agar and part of the water-soluble polymer by thermal decomposition, and a method wherein the green body is freeze-dried or vacuum-dried to remove large parts of the water and alcohols with the binder kept in the gel state and is then heated to remove the agar and part of the water-soluble polymer, which method is desirable because the green body can be prevented from being broken or cracked.

Further, the binder removal step is desirably carried out in a vacuum or an inert gas atmosphere to prevent the metal/ceramic powder from being oxidized.

After this binder removal step, the water content of the green body may be 0.01 to 0.1% by weight.

Then the brown body after the binder removal step is heated in a heating furnace to be sintered thereby providing a metal product having a desired shape. The heating is carried out in a vacuum or an inert gas atmosphere by elevating the temperature to about 1,100 to 1,500° C.

In such a binder for injection molding of a metal powder or a ceramic powder and in a molding method using such a binder, since the binder comprises an agar having a low molecular weight and water, the thermal decomposability of the binder is good. Therefore, the carbon residue and the oxygen residue in the molded product after the sintering are less than those of the prior art and hence the mechanical strength of the molded product is improved. Further, since the decomposability of the binder is good, a molded product having high sintered density can be obtained.

Further, in the step of the kneading the metal/ceramic powder and the binder kneading at an elavated temperature under pressure, can improve the kneadability. Accordingly, since the proportion of the metal/ceramic powder to be blended to the binder can be increased, thus the sintered density of the molded product can be increased to improve the mechanical strength.

Further, when the metal/ceramic powder is surface-treated with a coupling agent, since the affinity between the metal/ceramic powder and the binder is improved through the coupling agent, the wettability and adhesion between the metal powder and the binder are remarkably improved. Particularly, in the case wherein the particle diameter of the metal powder is as large as 10 $\mu$m or more, the effect for improving the adhesion between the metal powder and the binder is large and a metal powder having a large particle diameter of about 200 $\mu$m can be injection-molded.

Further, since the affinity between the metal/ceramic powder and the binder is increased, the proportion of the binder blended in the molding composition can be reduced and the amount of the metal powder to be blended can be increased. Therefore, the sintered density of the molded product can be increased and the precision of molded product can be improved.

Hereinbelow, the action and the effect of the present invention are described by showing examples. In passing, it should be noted that the present invention is not limited to the following examples.

EXAMPLE 1

Titanium powder that was obtained by the gas atomization method and whose particles were spheres having a particle diameter of 45 $\mu$m or less (average particle diameter of 25 $\mu$m) was surface-treated with a titanate type coupling agent in an amount of 1.5% per unit volume of the titanium powder by the above dry-treating method or wet-treating method.

On the other hand, 25 parts by weight of an agar and 0.1 part by weight of an antiseptic were dissolved in 100 parts by weight of warm water (deionized water) to prepare a binder. The agar had an average molecular weight of 82,500 and a gel strength of 425 g/cm$^2$ at an agar concentration of 4%.

The thus obtained surface-treated metal powder was heated to about 90 to 100° C. preliminarily and 55 parts by volume (680 parts by weight to 100 parts by weight of the deionized water) of the thus heated metal powder was added in three portions to 45 parts by volume of the above binder kept at 96° C. Then the mixture was kneaded under conditions of a temperature of 100 to 120° C. and a vapor pressure of 1.0 to 2.0 atm.

Then the obtained molding composition was pelletized, and after the pellets were injection-molded at an injection temperature of 94° C. and a mold temperature of 25° C., the mold was cooled with water to solidify the injection-molded product to obtain a rectangular green body having a width of 15 mm, a length of 100 mm, and a thickness of 10 mm.

Thereafter the green body was placed in a vacuum drying oven and was vacuum-dried under conditions having a temperature of 80° C. and a pressure of 1 Torr for 4 hours until the water content reached about 0.5% by weight, and then it was heated under a pressure of 10$^{-5}$ Torr from normal temperatures to 450° C. at a heating rate of 1° C./hour to remove the binder, then was heated to 1,300° C. at a heating rate of 5° C./hour, and was sintered under sintering conditions by keeping this temperature for 2 hours to prepare a titanium plate.

EXAMPLE 2

A titanium plate was prepared in the same manner as in Example 1, except the agar was replaced by an agar having an average molecular weight of 275,000 and a gel strength of 1,500 g/cm$^2$ at an agar concentration of 4%.

(Evaluation of the Molded Products)

With respect to the titanium plates obtained in Examples 1 and 2, the sintered density, the carbon residue (C), and the oxygen residue (O) were measured. The yield strength, the tensile strength, and the elongation were also measured.

The sintered density was 97.3% for Example 1 and 93.8% for the Example 2. The carbon residue was 0.33% for Example 1 and 0.50% for Example 2. The oxygen residue was 0.30% for Example 1 and 0.40% for Example 2. The yield strength was 55 kgf/mm$^2$ for Example 1 and 37 kg/mm$^2$ for Example 2. The tensile strength was 80 kgf/mm$^2$ for Example 1 and 50 kg/mm$^2$ for Example 2. The elongation was 10% for Example 1 and 3% for Example 2.

From these results, it can be said that, in comparison with Example 2 using a binder comprising an agar having a high molecular weight and a high gel strength, Example 1 using a binder comprising an agar having a low molecular weight and a low gel strength has low carbon residue and oxygen residue, excellent yield strength, tensile strength, and elongation, and improved the sintered density.

EXAMPLES 3, 4, AND 5

Titanium plates were prepared in the same manner as in Example 1, except that the agar was replaced by an agar having an average molecular weight of 50,000 and a gel strength of 250 g/cm$^2$ at an agar concentration of 4% (Example 3), an agar having an average molecular weight of 100,000 and a gel strength of 500 g/cm$^2$ at an agar concentration of 4% (Example 4), and an agar having an average molecular weight of 200,000 and a gel strength of 1,000 g/cm$^2$ at an agar concentration of 4% (Example 5). With respect to the obtained titanium plates, the sintered density and the carbon residue (C) were measured.

With respect to Example 3, the sintered density was 98.2% and the carbon residue was 0.30%.

With respect to Example 4, the sintered density was 96.0% and the carbon residue was 0.35%.

With respect to Example 5, the sintered density was 94.0% and the carbon residue was 0.45%.

We performed an additional experiment in an attempt to make molded products using an agar with an average molecular weight of less than 30,000 and an agar with a gel strength of less than 200 g/cm$^2$, in the same manner as in the Example 1. However, the obtained green bodies were poor in shape retainabillity, and were easily subjected to cracking and deformation. Therefore a plate that could be evaluated could not be obtained.

Figure 2:
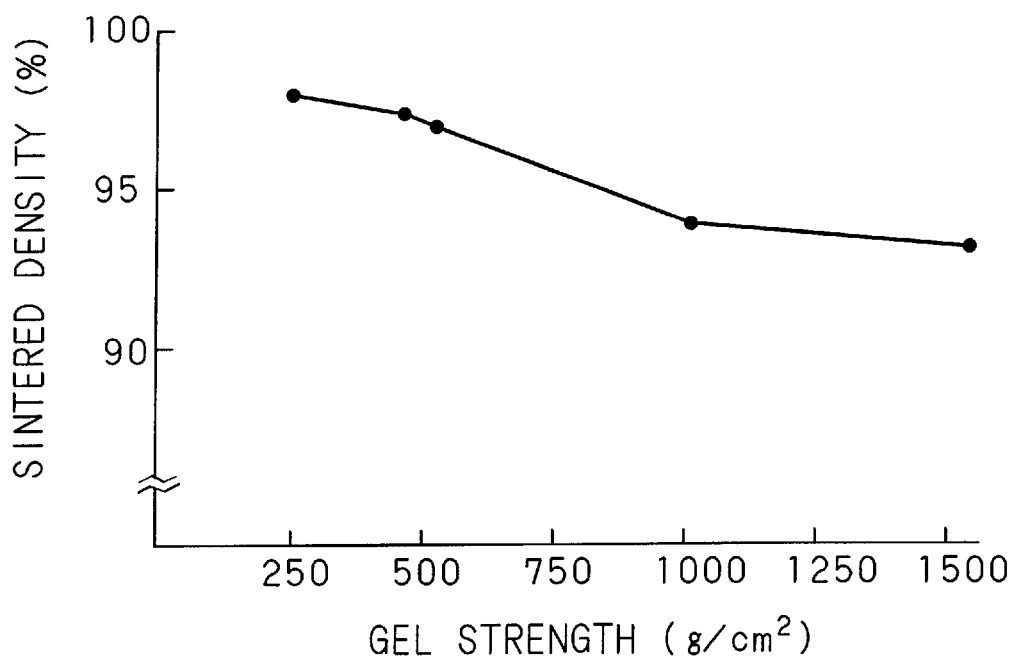
FIG. 2 is a graph that shows the relationship between the gel strength of agars comprised in a binder and the sintered density of obtained titanium plates in the Examples of the present invention.

FIG. 2 is a graph showing the relationship between the gel strength of the agars comprised in the binder and the sintered density of the obtained titanium plates of Examples 1 to 5.

Figure 3:
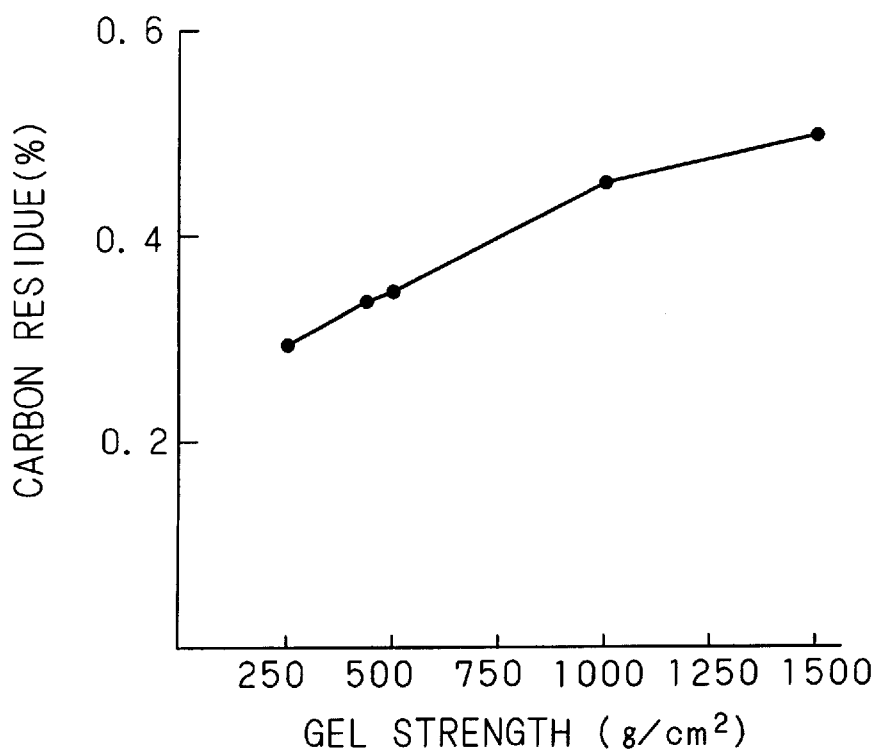
FIG. 3 is a graph that shows the relationship between the gel strength of agars comprised in a binder and the carbon residue of obtained titanium plates in the Examples of the present invention.

FIG. 3 is a graph showing the relationship between the gel strength of the agars comprised in the binder and the carbon residue (C) of the obtained titanium plates of Examples 1 to 5.

When the gel strength is high, the sintered density cannot be inccreased due to the large amount of carbon residue. On the contrary, when the gel strength is low, the carbon residue is low and the sintered density becomes high, therefore a product with a good mechanical strength can be obtained.

Figure 4:
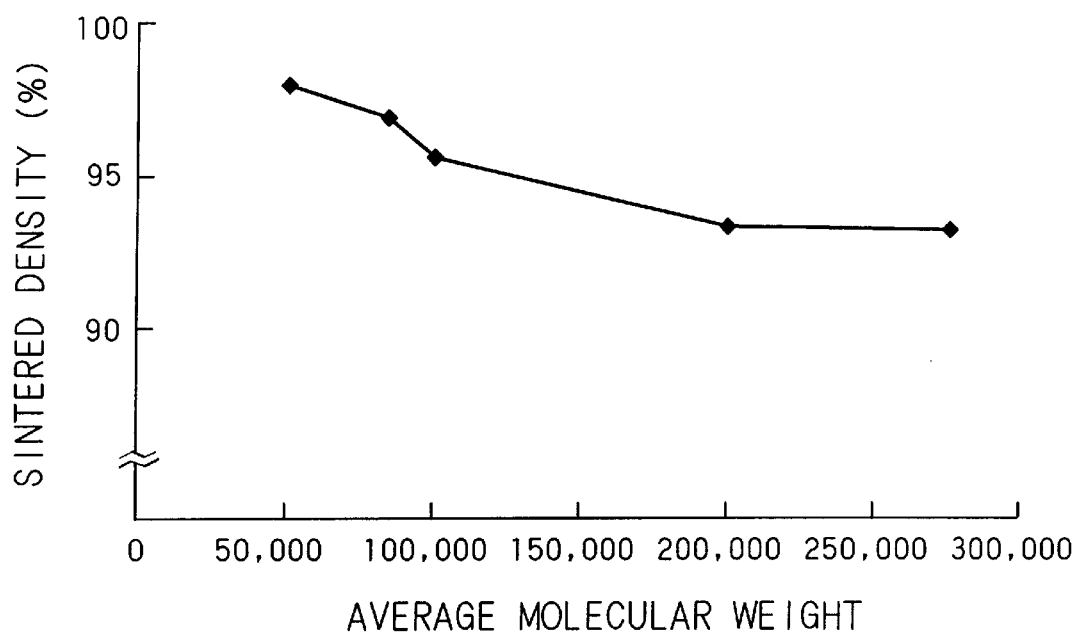
FIG. 4 is a graph that shows the relationship between the average molecular weight of an agar comprised in a binder and the sintering density of titanium plates in the Examples of the present invention.

FIG. 4 is a graph showing the relationship between the average molecular weight of the agar comprised in the binder and the sintered density of the obtained titanium plates of Examples 1 to 5.

Figure 5:
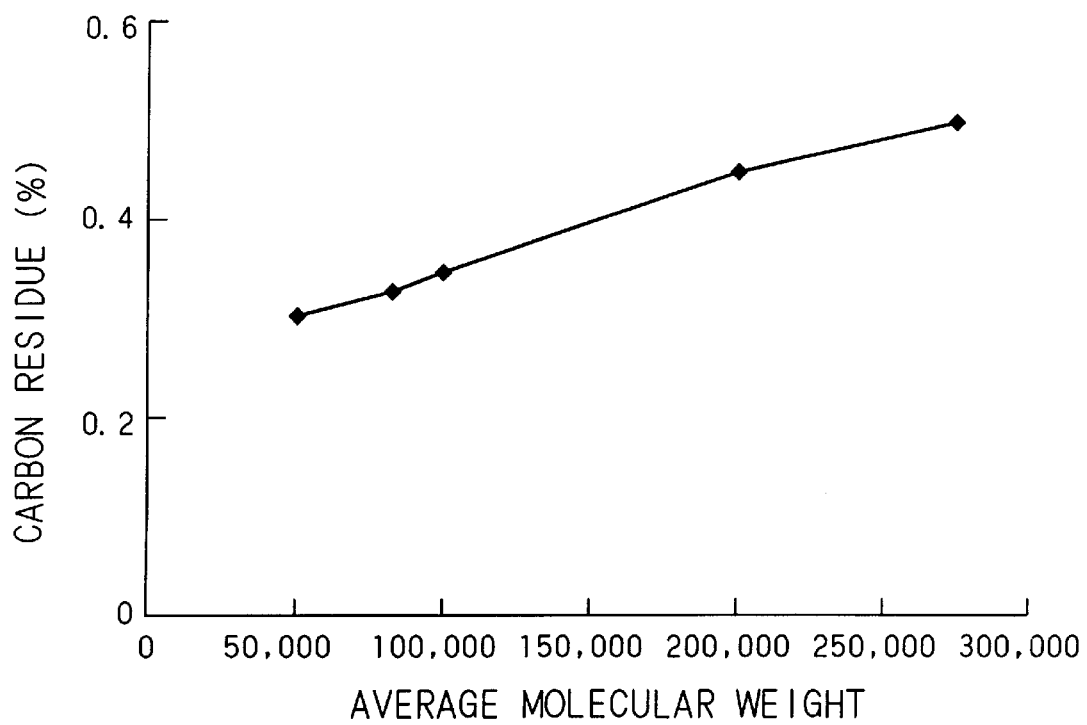
FIG. 5 is a graph that shows the relationship between the average molecular weight of an agar comprised in a binder and the carbon residue of obtained titanium plates in the Examples of the present invention.

FIG. 5 is a graph showing the relationship between the average molecular weight of the agar comprised in the binder and the carbon residue of the obtained titanium pates of Examples 1 to 5.

When the average molecular weight of an agar increases, the sintered density cannot be increased since the carbon residue increases due to poor decomposability. On the contrary, when the average molecular weight of an agar is kept low, the sintered density is high due to the smaller carbon residue, therefor, a product with good mechanical strength can be obtained.

For obtaining a product with a good mechanical strength, the carbon residue of sintneried molded product should be kept below 0.4%, preferably below 0.35%.

What is claimed is:

1. A binder for injection molding of a metal powder and/or a ceramic powder, comprising an agar selected to have an average molecular weight of 30,000 to 150,000 and water, wherein said binder leaves less than about 0.4% carbon residue in a sintered molded body.

2. A binder for injection molding of a metal powder and/or a ceramic powder comprising 15 to 35 parts by weight of an agar having an average molecular weight of 30,000 to 150,000 to 100 parts by weight of water.

3. A binder for injection molding of a metal powder and/or a ceramic powder according to claim 1, further comprising an alcohol and/or a water-soluble polymer.

4. A binder for injection molding of a metal powder and/or a ceramic powder according to claim 3, wherein:

said alcohol is at least one selected from the group consisting of ethanol, methanol, isopropyl alcohol, and 2,3-dibromopropanol; and said water-soluble polymer is at least one selected from the group comprising polyethyleneglycol, polyvinylalcohol, and carboxymethylcellulose.

5. A binder for injection molding of a metal powder and/or a ceramic powder comprising an agar having an average molecular weight of 30,000 to 150,000, water, alcohol and/or a water soluble polymer, wherein the alcohol is used in an amount of 5 to 30 parts by weight to 100 parts by weight of water, and the water-soluble polymer is used in an amount of 5 to 10 parts by weight to 100 parts by weight of water and alcohols.

6. A binder for injection molding of a metal powder and/or ceramic powder comprising an agar having an average molecular weight of 30,000 to 150,000 and water, wherein the agar has a gel strength of 200 to 480 g/cm$^2$ at 4% gel concentration.

7. A molding composition comprising:

a binder comprising an agar selected to have an average molecular weight of 30,000 to 150,000 and water, and at least one selected from the group consisting of a metal powder, a ceramic powder, and mixtures thereof, wherein the binder leaves less than about 0.4% carbon residue in a sintered molded body.

8. A molding composition according to claim 7, wherein:

said metal powder is one selected from the group consisting of iron, stainless steel, tungsten, titanium, nickel, cobalt, copper, aluminum, chromium, molybdenum, and mixtures thereof; and said ceramic powder is one selected from the group consisting of oxide, borate, silicate, and carbide of a metal, oxide, borate, silicate, and carbide of a non metal, and mixtures thereof.

9. A molding composition, comprising a binder including an agar having an average molecular weight of 30,000 to 150,000 and water, and at least one selected from the group consisting of a metal powder, a ceramic powder, and a mixture thereof, wherein the metal powder has an average particle diameter of 1 to 200 μm; and the ceramic powder has an average particle diameter of 0.1 to 10 μm.

10. A molding composition, comprising a binder including an agar having an average molecular weight of 30,000 to 150,000 and water, and at least one selected from the group consisting of a metal powder, a ceramic powder, and a mixture thereof, wherein the metal powder and the ceramic powder are pretreated with a coupling agent.

11. A molding composition, comprising a binder including an agar having an average molecular weight of 30,000 to 150,000 and water, and at least one selected from the group consisting of a metal powder, a ceramic powder, and a mixture thereof, wherein said molding composition includes 35 to 70% by volume of at least one of the metal powder, said ceramic powder, and the mixture.

12. A method of injection-molding a metal powder and/or a ceramic powder comprising:

1) preparing a binder comprising an agar having an average molecular weight of 30,000 to 150,000 and water, and at least one of a metal powder a ceramic powder, and mixtures thereof to prepare a molding composition, 2) pretreating at least one of a metal powder, a ceramic powder, and mixtures thereof with a coupling agent, 3) mixing the binder with at least one of the metal powder, the ceramic powder, the mixtures thereof with a coupling agent;

4) injection molding the molding composition to form a desired-shaped green body; and 5) sintering the green body.

13. A method of injection-molding a metal powder and/or a ceramic powder, comprising the steps of:

1) selecting an agar having ail average molecular weight of 30,000 to 150,000;

2) mixing said agar and water and at least one of a metal powder, a ceramic powder and mixtures thereof, to prepare a molding composition;

3) injection-molding said molding composition to form a desired-shaped green body; and 4) sintering said green body.

14. A method of injection-molding a metal powder and/or a ceramic powder according to claim 13, wherein said molding composition is pelletized before said step 3).

15. A method of injection-molding a metal powder and/or a ceramic powder according to claim 13, wherein said green body is subjected to a binder removal step for removing at least a part of the water contained in said green body before said step 4).

16. A method of injection-molding a metal powder and/or a ceramic powder according to claim 15, wherein at least part of an agar is also removed after the removal of the water.

17. A method of injection-molding a metal powder and/or a ceramic powder according to claim 13, wherein sintering is carried out in reduced pressure or an inert gas atmosphere by elevating the temperature to 1,100 to 1,500° C.

* * * * *